US010225723B1

(12) United States Patent
Son et al.

(10) Patent No.: US 10,225,723 B1
(45) Date of Patent: Mar. 5, 2019

(54) METHOD AND APPARATUS FOR CONTROLLING TRANSMISSION SIGNAL FOR DISASTER SCENE COMMUNICATION SYSTEM

(71) Applicant: ELECTRONICS AND TELECOMMUNICATIONS RESEARCH INSTITUTE, Daejeon (KR)

(72) Inventors: Kyo Hoon Son, Daejeon (KR); Myung Nam Bae, Daejeon (KR); Kang Bok Lee, Daejeon (KR); Hye Sun Lee, Daejeon (KR); Min Gi Jeong, Daejeon (KR); Sang Gi Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/856,296

(22) Filed: Dec. 28, 2017

(30) Foreign Application Priority Data

Dec. 12, 2017 (KR) .......................... 10-2017-0170532

(51) Int. Cl.
*H04W 4/90* (2018.01)
*H04W 52/28* (2009.01)
(Continued)

(52) U.S. Cl.
CPC .............. *H04W 4/90* (2018.02); *H04W 4/12* (2013.01); *H04W 52/283* (2013.01); *H04W 52/52* (2013.01); *H04W 64/006* (2013.01)

(58) Field of Classification Search
CPC ....... H04W 4/90; H04W 76/50; H04W 52/38; H04W 28/0226; H04W 40/20;
(Continued)

(56) References Cited

U.S. PATENT DOCUMENTS

| 9,609,672 B2 | 3/2017 | Park et al. |
| 2008/0069062 A1* | 3/2008 | Li .................... H04W 52/265 370/338 |

(Continued)

FOREIGN PATENT DOCUMENTS

| KR | 10-1336253 B1 | 12/2013 |
| KR | 10-2015-0098613 A | 8/2016 |
| WO | 2014/098446 A1 | 6/2014 |

*Primary Examiner* — Keith Ferguson
(74) *Attorney, Agent, or Firm* — LRK Patent Law Firm

(57) ABSTRACT

A method and apparatus for controlling a transmission signal for a disaster scene communication system. The method includes determining a type of a transmission message transmitted to a mobile terminal device by a control terminal device of the disaster scene communication system, determining a criticality level of the transmission message corresponding to the type of the transmission message, determining an initial distance between the control terminal device and the mobile terminal device by checking initial location information of the mobile terminal device, setting an initial transmission power in consideration of the criticality level of the transmission message corresponding to the type of the transmission message and the initial distance between the mobile terminal device and the control terminal device, and controlling a current transmission power based on the initial transmission power.

20 Claims, 9 Drawing Sheets

(51) Int. Cl.
*H04W 52/52* (2009.01)
*H04W 4/12* (2009.01)
*H04W 64/00* (2009.01)

(58) Field of Classification Search
CPC . H04W 4/021; H04W 52/143; H04W 52/247; H04W 52/386; H04W 72/0413; H04W 4/06; H04W 52/04; H04W 52/10; H04W 52/322
See application file for complete search history.

(56) References Cited

U.S. PATENT DOCUMENTS

2008/0136548 A1   6/2008  Park et al.
2010/0315230 A1*  12/2010 Kwon .................... G08B 25/10
                                                340/540

\* cited by examiner

METHOD AND APPARATUS FOR CONTROLLING TRANSMISSION SIGNAL FOR DISASTER SCENE COMMUNICATION SYSTEM

CROSS REFERENCE TO RELATED APPLICATION

The present application claims priority to Korean Patent Application No. 10-2017-0170532, filed Dec. 12, 2017, the entire content of which is incorporated herein for all purposes by this reference.

BACKGROUND OF THE INVENTION

1. Field of the Invention

The present disclosure relates to a public service process and more particularly to a method and apparatus for transmitting and receiving a wireless signal to and from an emergency management system.

2. Description of Related Art

Generally, in case an emergency such as a natural disaster or a fire occurs, there are emergency response organizations to provide countermeasures to such an emergency. For example, the police, the army, the fire department, voluntary work groups, and various similar organizations are emergency response organizations.

When a disaster or emergency is reported to an emergency response organization within an administrative area in which the disaster or emergency occurs, the emergency response organization dispatches emergency responders equipped with appropriate clothing and equipment to the disaster scene. At this time, a control manger who is in charge of the disaster scene assigns tasks to the emergency responders for effective disaster relief. The emergency responders rescue victims or perform tasks to normalize the disaster scene under instructions of the control manager.

However, conventionally, the control manager has to control all the activities for disaster relief and to manage emergency responders while only relying on his/her intuition, experience, and memory. Therefore, there were many secondary accidents such as injuries, distress, or even death on duty of emergency responders attributable to, for example, an excessive work time in a disaster scene. That is, due to an imperfect management system for managing emergency responders in a disaster scene, there were many cases where deaths on duty of emergency responders could not be reported until the disaster relief was finished. Accordingly, an appropriate method for systematically managing and protecting emergency responders is urgently required.

SUMMARY OF THE INVENTION

Disaster scenes may exist indoor and outdoor and a disaster countermeasure system may include a wireless communication device. Under circumstances when a disaster occurs indoor, wireless signals become attenuated while being transmitted due to various obstacles, which reduces a communication distance and deteriorates a data reception success rate. Accordingly, even though emergency responders are equipped with emergency response equipment, there is a difficulty in controlling and managing the activities of emergency responders.

In order to solve the problems described above, there is an approach of enhancing transmission power of wireless signals transmitted to emergency response equipment with which emergency responders are equipped. However, when the transmission power of signals is simply enhanced, signals communicated between the emergency response equipment distributed in various locations are likely to be interfered, resulting in deterioration of an overall communication performance of the emergency response equipment.

For this reason, a technology enabling reliable wireless communication between emergency response equipment in an indoor disaster scene is required.

A technical problem to be solved by the present disclosure is to provide a method and apparatus for controlling transmission power of wireless signals transmitted and received among emergency response equipment and for establishing a reliable communication environment for emergency response equipment.

Another technical problem to be solved by the present disclosure is to provide a method and apparatus for overcoming various communication obstacles in a disaster scene and for supporting and enabling a sufficient communication distance and a reliable wireless communication performance.

Technical problems to be solved by the present disclosure should not be limited to the ones described above, and the above and other technical problems to be solved by the present disclosure may be clearly understood from the following detailed description by those skilled in the art.

According to one aspect of the present disclosure, a method and apparatus for controlling a transmission signal for a disaster scene communication system are provided, the method including: determining a type of a transmission message transmitted to a mobile terminal device by a control terminal device of the disaster scene communication system; determining a criticality level of the transmission message corresponding to the type of the transmission message; determining an initial distance between the control terminal device and the mobile terminal device by checking initial location information of the mobile terminal device; setting an initial transmission power in consideration of the criticality level of the transmission message corresponding to the type of the transmission message and the initial distance between the mobile terminal device distance and the control terminal device; and controlling a current transmission power based on the initial transmission power.

According to another aspect of the present disclosure, a method of controlling a transmission signal for a disaster scene communication system is provided, the method including: determining a type of a transmission message transmitted to a mobile terminal device by a control terminal device of the disaster scene communication system; determining a criticality level of the transmission message corresponding to the type of the transmission message; determining an initial distance between the control terminal device and the mobile terminal device by checking initial location information of the mobile terminal device; setting an initial transmission power in consideration of the criticality level of the transmission message corresponding to the type of the transmission message and the initial distance between the mobile terminal device and the control terminal device distance; controlling a transmission power of the transmission message by using the initial transmission power; receiving a transmission power information message including information on a current transmission power with respect to the mobile terminal device; and controlling the transmission power of the transmission message by using the current transmission power.

According to a further aspect of the present disclosure, there is provided a control terminal device including: a message generator configured to set a type of a transmission message transmitted to a mobile terminal device provided in a disaster scene communication system and to generate transmission messages including the transmission message of the type; a message transmission controller configured to determine a criticality level of the transmission message corresponding to the type of the transmission message; a modulator configured to output a modulated signal of the transmission message; a transmission power controller configured to set an initial transmission power in consideration of the criticality level of the transmission message and an initial distance between the mobile terminal device and the control terminal device, and to control a current transmission power with reference to the initial transmission power; and a variable gain amplifier configured to amplify the modulated signal with a gain corresponding to the current transmission power.

According to a yet further aspect of the present disclosure, there is provided a mobile terminal device including: a controller configured to control generation of a transmission message transmitted to a control terminal device provided in a disaster scene communication system and to detect information included in a reception message transmitted by the control terminal device and received by the mobile terminal device; a message generator configured to set a type of a transmission message transmitted to the control terminal device provided in the disaster scene communication system and to generate transmission messages including the transmission message of the type; a modulator configured to output a modulated signal of the transmission message; a transmission power controller configured to set an initial transmission power in consideration of a criticality level of the transmission message corresponding to the type of the transmission message and an initial distance between the mobile terminal device distance and the control terminal device and to control a current transmission power based on information on the current transmission power included a transmission power information message transmitted by the control terminal device and received by the mobile terminal device; and a variable gain amplifier configured to amplify the modulated signal with a gain corresponding to the current transmission power.

The features of the present disclosure briefly summarized hereinabove are only for illustrative purposes but should not be construed as limiting the scope of the present disclosure.

According to the present disclosure, it is possible to provide a method and apparatus capable of establishing a reliable communication environment for emergency response equipment by controlling transmission power of wireless signals transmitted and received by the emergency response equipment.

In addition, according to the present disclosure, it is possible to provide a method and apparatus capable of overcoming various obstacles to communication even in a disaster scene environment and of securing a sufficient communication distance and a reliable wireless communication performance.

Advantages that can be obtained by the present disclosure are not limited to the ones described above, and other advantages can be clearly understood from the following detailed description by those skilled in the art.

BRIEF DESCRIPTION OF THE DRAWINGS

The above and other objects, features, and advantages of the present invention will be more clearly understood from the following detailed description when taken in conjunction with the accompanying drawings, in which.

DETAILED DESCRIPTION OF THE INVENTION

Figure 1:
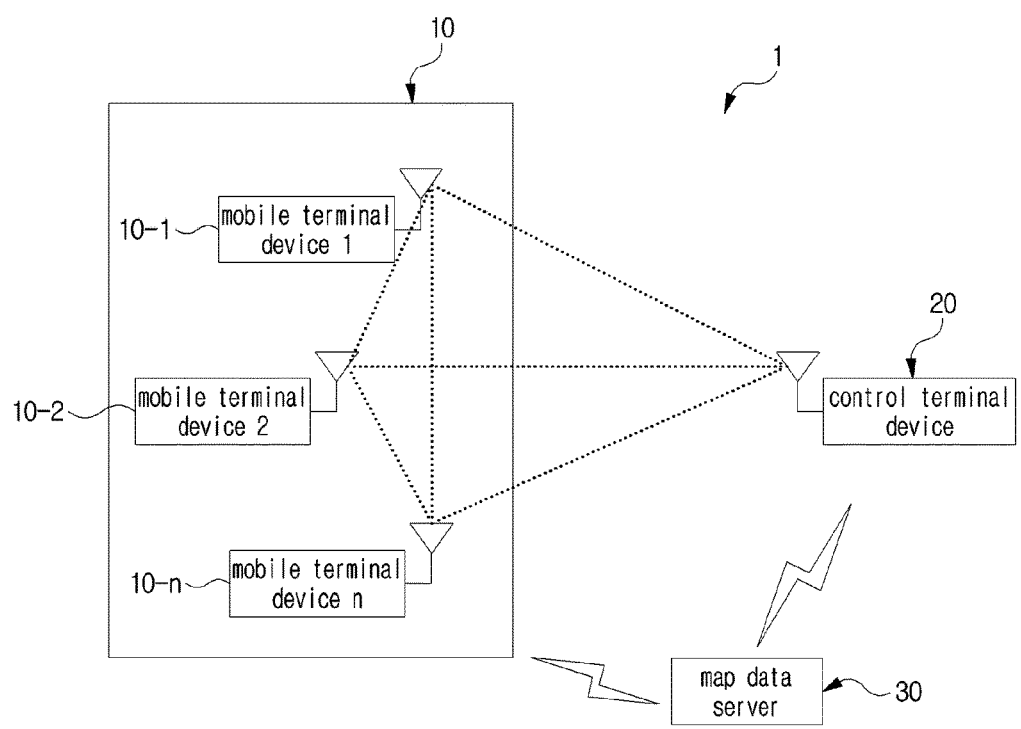
FIG. 1 is a block diagram illustrating the construction of a fire control system according to one embodiment of the present disclosure.

Hereinbelow, exemplary embodiments of the present invention will be described in detail with reference to the accompanying drawings such that the invention can be easily embodied by those ordinarily skilled in the art to which this invention belongs. However, the present disclosure may be embodied in various forms and should not be construed as being limited to the exemplary embodiments disclosed herein.

Further, when it is determined that the detailed description of the known art related to the present invention might obscure the gist of the present invention, the detailed description thereof will be omitted. Further, in the drawings, parts that are not related to the present disclosure are omitted, and like parts are denoted by like reference numerals.

In the present disclosure, it will be understood that when an element is referred to as being "coupled" or "connected" to another element, it can be directly coupled or connected to the other element or intervening elements may be present therebetween. It will be further understood that the terms "comprise", "include", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms first, second, etc. may be used herein to describe various elements, these elements should not be limited by these terms. These terms are only used to distinguish one element, from another element and not used to show order or priority among elements. For instance, a first element discussed below could be termed a second element without departing from the teachings of the present invention. Similarly, the second element could also be termed the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Hereinbelow, embodiments of the present disclosure will be described with reference to the accompanying drawings.

FIG. 1 is a diagram illustrating the construction of a fire control system according to one embodiment of the present invention.

Referring to FIG. 1, according to one embodiment of the present disclosure, a fire control system 1 includes at least one mobile terminal device 10, a control terminal device 20, and a map data server 30.

The mobile terminal device 10 includes at least one sensor. The mobile terminal device 10 may display sensor data detected by the at least one sensor or may transmit the sensor data to the control terminal device 20. For example, the at least one sensor may include a temperature sensor, a sensor that detects a state (for example, an oxygen level in an oxygen tank) of equipment with which a user (for example, firefighter) of the mobile terminal device 10 is equipped, and the like.

The mobile terminal device 10 may generate state information by using the sensor data and include an alerting means for warning of danger based on the generated state information. The alerting means may be a speaker, a display, a lamp, a vibration motor, or the like.

The mobile terminal device 10 may transmit the state information to the control terminal device 20.

The mobile terminal device 10 may include a location sensor detecting the location of the mobile terminal device 10 and a motion sensor detecting the motion of the mobile terminal device 10. Due to the location sensor and the motion sensor, the location of the terminal can be determined in real time. The mobile terminal device 10 may periodically transmit location information to the control terminal device 20.

The mobile terminal device 10 is connected to the map data server 30, so that the mobile terminal device 10 can be provided with map data by the map data server 30. Specifically, the mobile terminal device 10 may receive map data of a region corresponding to the location of the mobile terminal device 10. The mobile terminal device 10 may display the received map data, along with the location information of the terminal and the location information of nearby mobile terminal devices 10.

The mobile terminal device 10 may include a microphone and/or a camera and transmit data (for example, voice data and image data) acquired by the microphone and/or the camera (for example, an IR camera) in real time to the control terminal device 20. The mobile terminal device 10 may output the data (for example, voice data and image data) provided by the control terminal device 20. Specifically, the mobile terminal device 10 may receive from the control terminal device 20 a signal (for example, a command of return) indicating a command for ordering the user of the mobile terminal device to return and output the command of return by means of the alerting means. The mobile terminal device 10 may generate a route (for example, return route) from a current location to a return destination (for example, a location at which the control terminal device is located) in response to the command of return, and display the generated return route.

The mobile terminal device 10 may be mounted to a fireproof helmet or electronic goggles with which the firefighter is equipped, and may include a transparent display or a projection device for displaying the sensor data, the state information, the map data, the location information, the return route, and the like.

The control terminal device 20 may receive map data provided by the map data server 30 through a wired or wireless communication network, and particularly receive map data of a region corresponding to the location of at least one mobile terminal device 10. The control terminal device 20 may display location information of each mobile terminal device 10 on the display thereof, based on the location information transmitted by each of the mobile terminal devices 10.

The control terminal device 20 may be connected to at least one mobile terminal device 10, thereby receiving the sensor data or the state data provided by the at least one mobile terminal device 10. In addition, the control terminal device 20 may receive the data (for example, voice data, image data, etc.) acquired by the microphone and/or the camera of the at least one mobile terminal device 10. The control terminal device 20 may output the received data (for example, voice data, image data, etc.) through a speaker or a display device in real time or may have the received data stored therein.

The control terminal device 20 may include at least one input device. More particularly, the control terminal device 20 may include an input device (for example, a return command button) that can generate a signal indicating the command of return. When the return command button is pressed, the control terminal device 20 may generate the signal (for example, the command of return) indicating the command of return in response to an input signal that is input through the return command button and perform a process of transmitting the command of return to the at least one mobile terminal device 10 with the highest priority, while putting this process ahead all the processes interworked with the mobile terminal devices 10.

The map data server 30 may store map data and transmit map data of a region requested by the mobile terminal device 10 or the control terminal device 20. In one embodiment of the present disclosure, the map data stored in the map data server 30 according to one embodiment of the present disclosure may be detailed map data of indoor regions and detailed map data of outdoor regions.

The map data server 30 provides the map data to the mobile terminal device 10 through a portable terminal (for example, a mobile communication terminal) connected to the mobile terminal device 10 and provides the map data to the control terminal device 20 through an Ethernet communication network.

Although the case where the mobile terminal device 10 or the control terminal device 20 receives the map data provided by the map data server 30 is exemplified in one embodiment of the present disclosure, the present disclosure may not be limited thereto. Alternatively, the mobile terminal device 10 or the control terminal device 20 may have the map data stored therein.

The control terminal device 20 and the at least one mobile terminal device 10 may be connected via a wireless communication network. The fire control system 1 according to one embodiment of the present disclosure is a system for use in a special environment such as a fire scene. Therefore, in the fire control system 1, connection stability in communication between the control terminal device 20 and each of the mobile terminal devices 10 is required. Accordingly, in one embodiment of the present disclosure, the wireless communication network adopts a communication scheme that can maintain stable communication between the control terminal device 20 and each of the mobile terminal devices 10. For example, a communication channel used in the wireless communication network may be a channel using a frequency band of 1 GHz or lower, which can guarantee reliable transmission. In addition, in buildings in which fire extinguishing activities are mainly performed, a wireless communication performance is deteriorated due to presence of many obstacles. Therefore, a communication network topology between the control terminal device 20 and each of the mobile terminal devices 10 may be constructed by partially adding a relay function to a star network.

Particularly, when taking these environmental characteristics into consideration, there may be cases where the control terminal device 20 needs to transmit a message to at least one of the mobile terminal devices 10. For example, the control terminal device 20 may receive the sensor data or the state information provided by at least one of the mobile terminal devices 10 and may determine in which situation and condition a user of the mobile terminal device 10 is, based on the sensor data or the state information. After that, the control terminal device 20 may generate a message (for example, a return command message) commanding the user to return by considering the situation and condition of the user of the mobile terminal device 10 and transmit the message to the mobile terminal device 10.

The message commanding the user to return (for example, the return command message) must be safely transmitted to at least one mobile terminal device 10 on all accounts for protection of the user of the at least one mobile terminal device 10.

However, when the at least one mobile terminal device 10 is in a building, a signal communicated between the control terminal device 20 and the at least one mobile terminal device 10 is likely to be attenuated due to a long distance therebetween or due to the presence of obstacles such as complex structures, which dramatically deteriorate a data reception success rate.

In addition, in order for the control terminal device 20 to reliably transmit the return command message or the like to the at least one mobile terminal device 10, the output power of a transmission signal may be increased to offset the signal attenuation that is likely to occur. However, when the output power of the transmission signal is simply increased, the transmission signal with the increased output power may interfere with a signal communicated between the terminal 20 and a nearby wireless communication network, thereby deteriorating a signal reception performance of the nearby wireless communication network. Therefore, it is required to develop a method of guaranteeing reliable message transmission between the control terminal device 20 and each of the mobile terminal devices 10 in the fire control system 1.

To this end, the control terminal device 20 may determine a type of a transmission message to be transmitted to the mobile terminal device, and determine a transmission power value of a signal (transmission message) in accordance with a criticality level of the transmission message which is determined based on the type of the transmission message. The control terminal device 20 may transmit the transmission message by using the determined transmission power value.

The control terminal device 20 may check whether there is a reply message confirming that the mobile terminal device has safely received the transmission message and may transmit the transmission message again when it is determined that there is no reply message, depending on the type of the transmission message.

When the criticality level of the transmission message is determined as being high based on the type of the transmission message, the control terminal device 20 may perform a countermeasure to an event in which there is no reply message. That is, in this case, the control terminal device 20 may add a compulsive increment value to a previous transmission power value, thereby setting a higher transmission power value than the previous transmission power value. When setting the transmission power value, the control terminal device 20 may add the product of the number of times of retransmission of the transmission message and the compulsive increment value to the previous transmission power value, thereby setting a higher transmission power value than the previous transmission power value.

Conversely, when the reply message is received by the control terminal device 20, the control terminal device 20 may set the transmission power value to the previous transmission power value.

Figure 2:
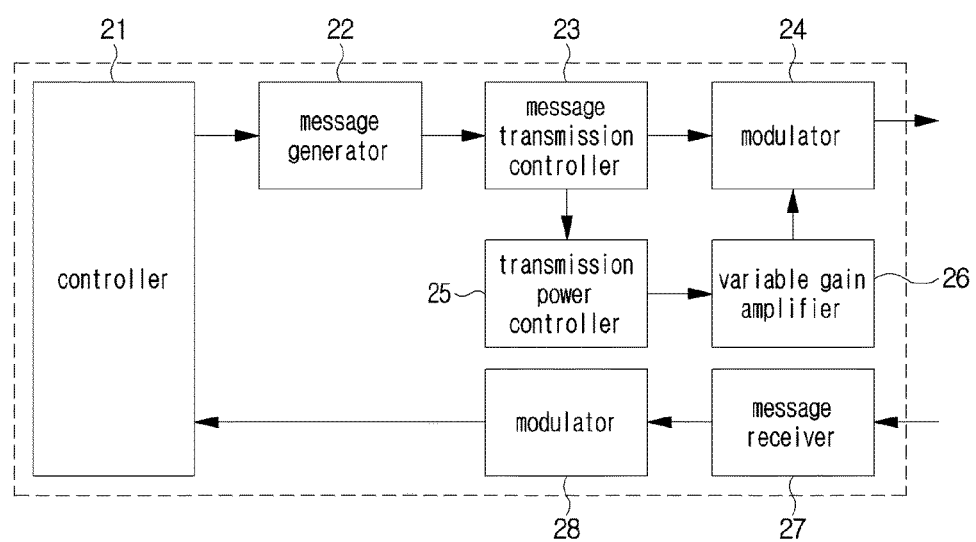
FIG. 2 is a block diagram illustrating the construction of a control terminal device according to one embodiment of the present disclosure.

FIG. 2 is a block diagram illustrating the construction of a control terminal device according to one embodiment of the present disclosure.

Referring to FIG. 2, a control terminal device includes a controller 21, a message generator 22, a message transmission controller 23, a modulator 24, a transmission power controller 25, and a variable gain amplifier 26.

First, the control terminal device may be provided with environments (input and output devices, controller, and the like) that can perform the following processes: registering mobile terminal devices 10; grouping the mobile terminal devices 10; receiving and displaying the state information detected by the mobile terminal devices 10 on the display of the control terminal device; receiving and displaying location information detected by the mobile terminal devices 10 on the display of the control terminal device; transmitting an alerting signal to the mobile terminal devices 10; transmitting a return command to at least one of the mobile terminal devices 10; and transmitting a receipt notification with respect to a message transmitted by at least one mobile terminal device 10. Particularly, the controller 21 may detect a signal that is input through any input device with which the control terminal device is equipped and perform an operation corresponding to the detected signal. The controller 21 may output information or data generated during operation of the control terminal device through an output device such as a display or a notification device (speaker, indicator, etc.).

The message generator 22 may generate predetermined messages, according to predetermined operations of the control terminal device.

For example, when there is a request for registration of a certain mobile terminal device 10, the controller 21 may request that the message generator 22 generates a time information message, a group information message, an initial location information message, etc. In response to this request, the message generator 22 may generate the time information message, the group information message, the initial location information message, etc. and send them to the message transmission controller 23.

Alternatively, when there is a request for transmission of an alert notification to the mobile terminal device 10, the controller 21 requests that the message generator 22 generates an alert notification message, and thus the message generator 22 generates the alert notification message and sends it to the message transmission controller 23 according to the request.

When there is a request for transmission of a return command to the mobile terminal device 10, the controller 21 requests that the message generator 22 generates a return command message, and thus the message generator 22 generates the return command message and sends it to the message transmission controller 23.

In addition, when a message transmitted by the mobile terminal device 10 is received by the control terminal device, the controller 21 may request that the message generator 22 generates a receipt notification message indicating safe reception of the message, and the message generator 22 generates the receipt notification message and sends it to the message transmission controller 23.

In addition, the controller 21 may check transmission power information with respect to at least one mobile terminal device 10 periodically at a predetermined time interval, and requests that the message generator 22 generates a transmission power information message. In response to this request, the message generator 22 generates the transmission power information message and sends it to the message transmission controller 23.

Exemplary messages generated by the message generator 22 according to the operations described above are shown in FIG. 3.

Figure 3:
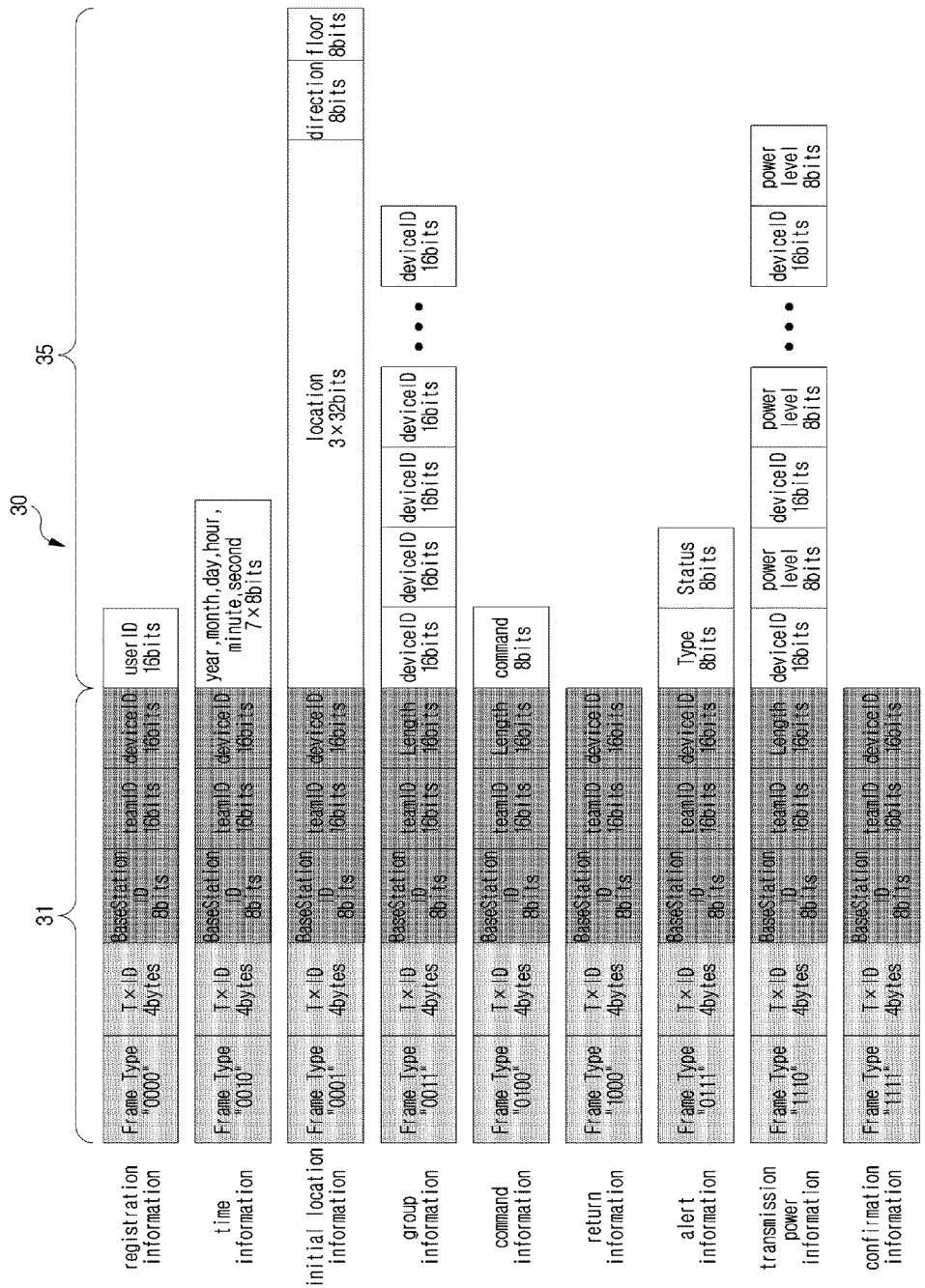
FIG. 3 is a diagram illustrating a message generated by the control terminal device according to one embodiment of the present disclosure.

Referring to FIG. 3, a transmission message 30 may include a frame header 31 and a frame payload 35. In the frame header 31, a frame type identification (frame type ID) may include an identifier indicating a type of a message, a transmission identification (Tx ID) may include an identifier of a transmission sequence of a message, a base station identification (base station ID) may include an identifier of a control terminal device, a team identification (team ID) may include an identifier of a team using the control terminal device, and a mobile terminal device identification (device ID) may include an identifier of a mobile terminal device connected to the control terminal device.

The message transmission controller 23 may provide information required for control of a transmission power to the transmission power controller 25 or retransmit the transmission message, depending on the type of the transmission message.

Specifically, the message transmission controller 23 may check the type of the transmission message and determine a criticality level of the transmission message in accordance with the type of transmission message. Next, the message transmission controller 23 may transmit the determined criticality level to the transmission power controller 25.

For example, the message transmission controller 23 may check the value of the frame type ID, and determine the criticality level of the transmission message as follows: when the value of the frame type ID indicates the return command message or the alert notification message, the message transmission controller 23 determines the criticality level of the transmission message as being "high"; when the value of the frame type ID indicates the time information message, the group information message, or the initial location information message, the message transmission controller 23 determines the criticality level of the transmission message as being "medium"; and when the value of the frame type ID indicates the receipt notification message, the message transmission controller 23 determines the criticality level of the transmission message as being "low".

In addition, the message transmission controller 23 may check whether there is a reply message with respect to the transmission message and may retransmit the transmission message when there is no reply message, depending on the type of the transmission message.

For example, when the value of the frame type ID of the transmission message indicates the return command message, the message transmission controller 23 may retransmit the transmission message until the control terminal device receives the reply message with respect to the transmission message from at least one mobile terminal device 10. In this case, the message transmission controller 23 may count the number of retransmissions and send the counted number to the transmission power controller 25.

The modulator 24 may modulate the transmission message based on a predetermined modulation scheme. As the modulation scheme, various schemes may be used. Any modulation scheme that is previously defined in the control terminal device and at least one mobile terminal device 10 can be used as the modulation scheme.

The transmission power controller 25 may set a transmission power value of the transmission message by considering the criticality level transmitted by the message transmission controller 23.

For example, the return command message, the alert notification message, etc. are messages occurring in dangerous situations and thus they are highly critical. Accordingly, since the return command message, the alert notification message, etc. contain important information, it is preferable that the transmission power of these messages is initially set to a high value so that a reception success rate can be increased. Therefore, the transmission power controller 25 may set different transmission power values for the respective transmission messages by varying initial transmission power values of the transmission messages in accordance with the criticality levels of the transmission messages.

A control manager or a senior firefighter who is in overall charge of a disaster situation may operate the control terminal device 20, and firefighters who are dispatched to a disaster scene may be equipped with the mobile terminal devices 10 when entering the disaster scene. In this setting, the control manager or the senior firefighter may directly instruct the dispatched firefighters to go to initial locations, and accordingly, the firefighters may follow the instruction. In consideration of this setting, the control manager or the senior firefighter may set the initial locations of the mobile terminal devices 10 with which the firefighters are equipped, by inputting the initial locations into the control terminal device 20, and thus the controller 21 can determine the initial locations of the mobile terminal devices 10. Alternatively, for example, setting of the initial locations of the mobile terminal devices 10 may be performed group by group.

Accordingly, the controller 21 may provide the transmission power controller 25 with information of the initial locations of the mobile terminal devices 10, and the transmission power controller 25 may control the transmission power of the transmission message to be transmitted to the mobile terminal devices 10 in consideration of the initial locations of the mobile terminal devices 10. For example, the transmission power controller 25 may allocate a relatively high transmission power for communication with a mobile terminal device 10 that is relatively far from the control terminal device 20 in comparison with communication with a mobile terminal device 10 that is relatively close to the control terminal device 20.

In addition, the transmission power controller 25 may set the initial transmission power value of the transmission message in accordance with the criticality level of the transmission message provided by the message transmission controller 23 and the location information of the mobile terminal device 10.

Figure 4:
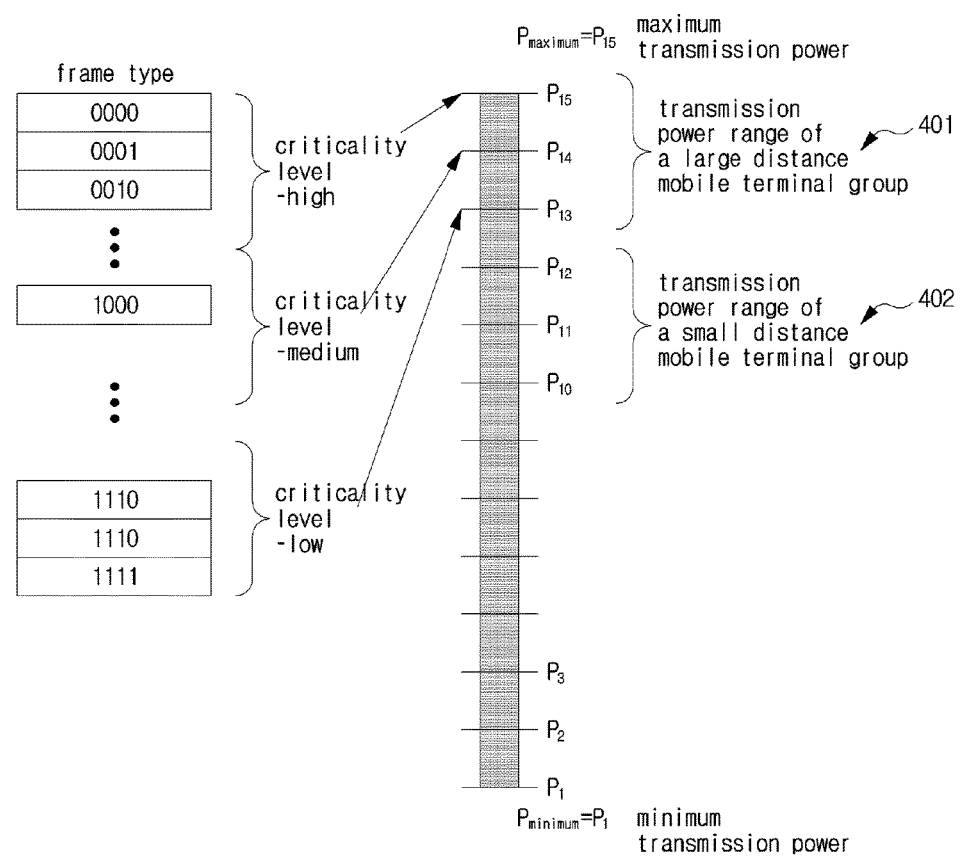
FIG. 4 is a diagram illustrating an exemplary operation of the control terminal device to determine a transmission power of a signal.

Referring to FIG. 4, the transmission power controller 25 may determine distances between the control terminal device 20 and each mobile terminal device 10, based on the location information of the mobile terminal devices 10, and may group the mobile terminal devices 10 based on the determined distances. For example, when the distance between the control terminal device 20 and a certain mobile terminal device 10 is greater than a first distance, the transmission power controller 25 classifies this mobile terminal device 10 as a first distance mobile terminal device group 401. When the distance between the control terminal device 20 and another mobile terminal device 10 is less than the first distance but greater than a second distance, the transmission power controller 25 classifies this mobile terminal device 10 as a second distance mobile terminal device group 402.

In addition, the transmission power controller 25 may check the criticality level provided by the message transmission controller 23 and may set the initial transmission power value of the transmission message in accordance with the criticality level, with respect to the mobile terminal devices included in the same distance mobile terminal device group. For example, when a certain mobile terminal device 10 is determined as belonging to the first distance mobile terminal device group 410 and when the criticality level of the transmission message, provided by the message transmission controller 23, is determined as being "high", the transmission power controller 25 may set the initial transmission power value of the transmission message, which is to be transmitted to the mobile terminal device 10, to a power value P15 that is a fifteenth magnitude. In a similar way, when another certain mobile terminal device is determined as belonging to the first distance mobile terminal device group 410 and when the criticality level provided by the message transmission controller 23 is determined as being "medium", the transmission power controller 25 may set the initial transmission power value of the transmission message, which is to be transmitted to the mobile terminal device 10, to a power value P14 that is a fourteenth magnitude. Further, in a similar way, when the criticality level provided by the message transmission controller 23 is determined as being "low", the transmission power controller 25 may set the initial transmission power value of the transmission message, which is to be transmitted to the mobile terminal device 10 within the first distance mobile terminal device group, to a power value P13 that is a thirteenth magnitude.

Meanwhile, after the initial transmission power value is set through the operation as described above, the transmission power controller 25 may control the transmission power value of the transmission message in accordance with a determination result of whether a reply message transmitted by the mobile terminal device 10 is received by the control terminal device. For example, the transmission power controller 25 may receive a determination result of whether there is the reply message transmitted by the mobile terminal device, from the message transmission controller 23. When there is no reply message from the mobile terminal device, the transmission power controller 25 may add a compulsive increment value to a previous transmission power value, thereby setting a higher transmission power value than the previous transmission power value.

In addition, the transmission power controller 25 also may be provided with the counted number of retransmissions of the transmission message by the message transmission controller 23 and may set the transmission power value by reflecting the counted number of the retransmissions of the transmission message on the compulsive increment value.

Alternatively, for example, the transmission power controller 25 may determine a transmission power level control method in accordance with the type of the transmission message, and set the transmission power value in accordance with the transmission power level control method. Here, examples of the transmission power level control method may include a compulsive level increment method and an adaptive level control method.

For example, the transmission power controller 25 may determine the compulsive level increment method as the transmission power level control method for the return command message among various transmission messages. Meanwhile, the transmission power controller 25 may determine the adaptive level control method as the transmission power level control method for a situation explanation message.

According to the compulsive level increment method, the transmission power controller 25 may receive a determination result of whether there is a reply message transmitted by a mobile terminal device, from the message transmission controller 23. When the determination result reveals that there is no reply message, the transmission power controller 25 adds a compulsive increment value to the previous transmission power value, thereby setting a higher transmission power value than the previous transmission power value.

In addition, the transmission power controller 25 may be provided with the counted number of retransmissions of the transmission message by the message transmission controller 23, and may set a new transmission power value by reflecting the counted number of retransmissions of the transmission message. For example, the transmission power controller 25 may set a higher transmission power value for the transmission message than the previous transmission power value by adding the product of the counted number of retransmissions of the transmission message and the compulsive increment value to the previous transmission power value.

Meanwhile, according to the compulsive level increment method, the transmission power controller 25 may set a transmission power value equal to the previous transmission power value when the determination result reveals that there is the reply message.

According to the adaptive level control method, the transmission power controller 25 may receive a determination result of whether there is a reply message transmitted by a mobile terminal device with respect to a transmission message, from the message transmission controller 23. Next, when the determination result reveals that there is no reply message, the transmission power controller 25 may set a higher transmission power value for the transmission message than the previous transmission power value by adding the compulsive increment value to the previous transmission power value.

Meanwhile, according to the adaptive level control method, when the determination result reveals that there is the reply message, the transmission power controller 25 may receive an reception signal attenuation value included in the reply message transmitted by at least one mobile terminal device 10, from the message transmission controller 23, and set a current transmission power value by adding the reception signal attenuation value to the previous transmission power value.

The variable gain amplifier 26 may set the transmission power of the transmission message in accordance with the transmission power value provided by the transmission power controller 25, and may amplify a transmission signal provided by the modulator 24 to the transmission power that is set, and output the amplified transmission signal. The transmission signal amplified by the variable gain amplifier 26 may be transmitted to at least one mobile terminal device 10 via an antenna.

The control terminal device 20 may further include a message receiver 27 and a demodulator 28.

The message receiver 27 may transfer a message (i.e., reception message) transmitted by at least one mobile terminal device 10 to the demodulator 28, and the demodulator 28 demodulates the message transmitted by the at least one mobile terminal device 10 and send the demodulated message to the controller 21.

The message receiver 27 may determine a signal intensity of the reception message and provide the transmission power controller 25 with information of the signal intensity. The transmission power controller 25 determines a signal attenuation value based on the signal intensity of the reception message and controls the transmission power by reflecting the signal attenuation value.

In addition, the controller 21 may check the frame type ID included in the demodulated reception message and determine the type of the reception message. When the reception message is a reply message, the controller 21 may provide the message transmission controller 23 with the reply message or information indicating that the reply message is received.

In addition, the controller 21 may perform an operation process based on the type of the reception message. For example, when the reception message is the state information message, the controller 21 may perform an operation process of confirming the state information included in the state information message and displaying the state information on an output device such as a display. Alternatively, when the reception message is the location information message, the controller may perform an operation process of confirming the location information included in the location information message and displaying the location information on an output device such as a display.

Figure 5:
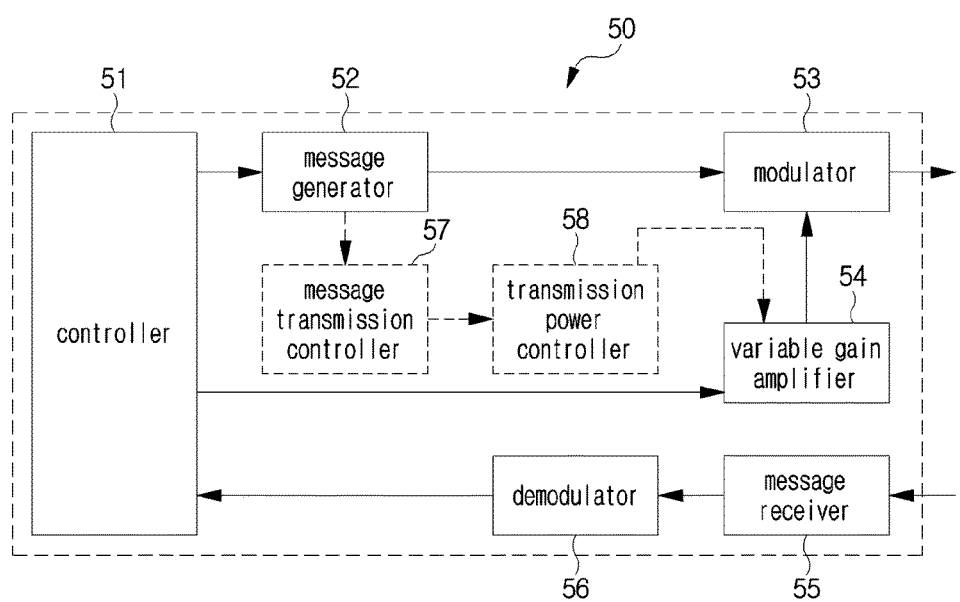
FIG. 5 is a block diagram illustrating the construction of a mobile terminal device according to one embodiment of the present disclosure.

FIG. 5 is a block diagram illustrating the construction of a mobile terminal device according to one embodiment of the present invention.

Referring to FIG. 5, a mobile terminal device 50 includes a controller 51, a message generator 52, a modulator 53, a variable gain amplifier 54, a message receiver 55, and a demodulator 56.

The mobile terminal device may perform various processes of collecting state information from sensors provided therein, providing collected information through an output device such as a display, checking location information and displaying the location information on an output device such as a display, outputting an alerting signal, outputting a return command, transmitting a reply message with respect to a transmission message transmitted by a control terminal device, etc.

The controller 51 may receive a signal or information input through an input device or a sensor provided in the mobile terminal device 50, and perform an operation process based on the signal or information. In addition, the controller 51 may output information or data generated during operation of the mobile terminal device 50 through an output device such as a display or a notification device (speaker, indicator, etc.).

Specifically, the controller 51 may check a reception message received and provided by the message receiver 55 and the demodulator 56, check information included in the reception message, and provide a user with the information through the output device.

For example, when there is a request for connection to the control terminal device, the controller 51 may be prepared to receive messages required for connection to the control terminal device, such as a time information message, a group information message, and an initial location information message. When the mobile terminal device receives the time information message, the controller 51 may perform a synchronization process of synchronizing the mobile terminal device and the control terminal device by using time information included in the time information message. When the mobile terminal device receives the group information message, the controller 51 may perform a process of connecting the mobile terminal device with other mobile terminal devices within the same group by using group information included in the group information message. When the mobile terminal device receives the initial location information message, the controller 51 may display initial location information on an output device such as a display.

In addition, the controller 51 may display return command information on an output device such as a display or a notification device (speaker, indicator, etc.) when it is determined that the reception message is the return command message. Similarly, when the reception message is an alert notification message, the controller 51 may display alert notification information by using an output device such as a display or a notification device (speaker, indicator, etc.).

In addition, the controller 51 may check the type of the reception message and determine whether the reception message is a message requiring a reply thereto. When the reception message is such a message (for example, the return command message and the alert notification message) requiring a reply thereto, the controller 51 may request that the message generator 52 generates a reply message.

In addition, the controller 51 may check a transmission power value included in the reception message, and control a gain of the variable gain amplifier 54 by using the transmission power value. The transmission power value may be included in the return command message or the alert notification message, or may be provided in the form of a separate message (for example, transmission power message) for providing information of the transmission power value.

The message generator 52 may generate predetermined messages in accordance with predetermined operation processes of the mobile terminal device 50.

For example, the controller 51 may check the type of the reception message and determine whether a reply to the reception message is required. When the reception message is a message (for example, the return command message or the alert notification message) requiring a reply thereto, i.e., when it is necessary to transmit a reply message, the controller 51 may request that the message generator 52 generates a reply message, and thus the message generator 52 generates the reply message and sends it to the modulator 53.

In addition, the controller 51 may provide the message generator 52 with state information periodically at a predetermined time interval and request that the message generator 52 generates a state information message. In response to this request, the message generator 52 may generate the state information message and send it to the modulator 53. Similarly, the controller 51 may provide the message generator 52 with location information periodically at a predetermined time interval and request that the message generator 52 generates a location information message. In response to this request, the message generator 52 may generate the location information message and send it to the modulator 53.

Examples of the messages generated by the message generator 52 through the operation process described above are shown in FIG. 6.

Figure 6:
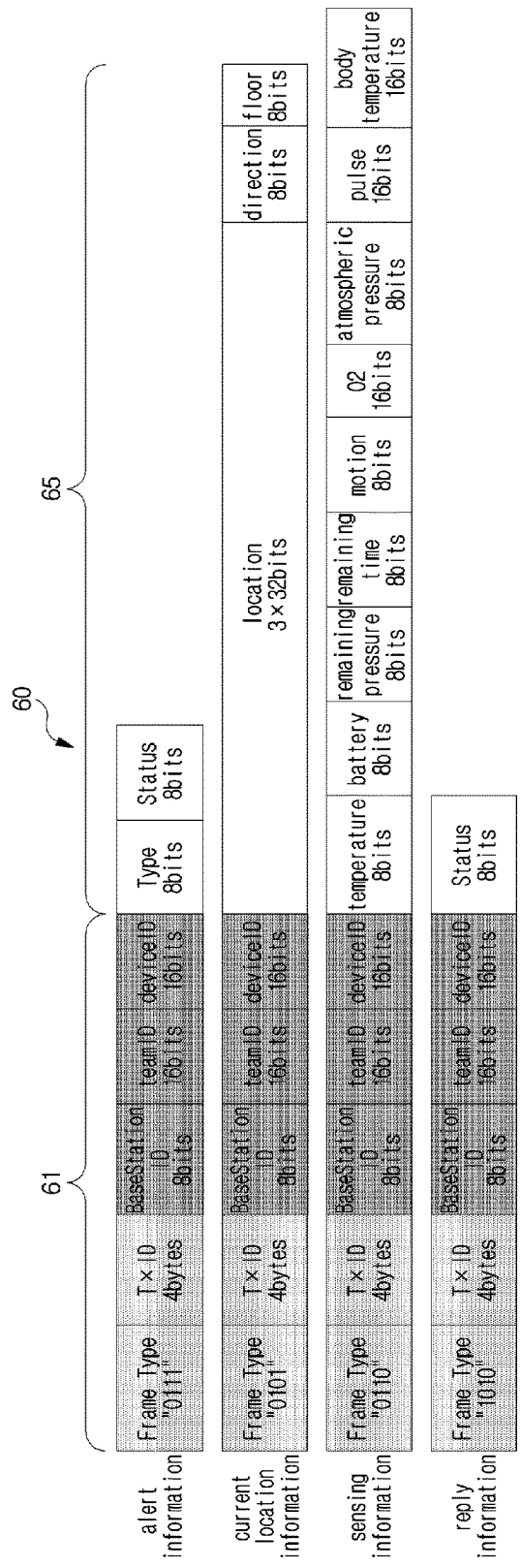
FIG. 6 is a diagram illustrating a message generated by the mobile terminal device according to one embodiment of the present disclosure.

Referring to FIG. 6, a transmission message 60 may include a frame header 61 and a frame payload 65. In the frame header 61, a frame type ID includes an identifier indicating a type of a message, a transmission ID (Tx ID) includes an identifier of a transmission sequence of a message, a base station ID includes an identifier of a control terminal device, a team ID includes an identifier of a team using the control terminal device, and a mobile terminal device ID (device ID) includes an identifier of a mobile terminal device connected to the control terminal device.

In the embodiment described above, the controller 51 checks the transmission power value included in the reception message, and controls the gain of the variable gain amplifier 54 by using the transmission power value. However, the present disclosure is not limited thereto.

Alternatively, the mobile terminal device 50 may further include a message transmission controller 57 and a transmission power controller 58, and the gain of the variable gain amplifier 54 is controlled by the message transmission controller 57 and the transmission power controller 58.

The message transmission controller 57 may provide the transmission power controller 58 with information required for control of the transmission power or may retransmit the transmission message, depending on the type of the transmission message.

Specifically, the message transmission controller 57 may check the type of the transmission message, and determine a criticality level of the transmission message in accordance with the type of the transmission message. The message transmission controller 57 may provide the transmission power controller 58 with the determined criticality level.

For example, when the reception message is the return command message or the alert notification message, the controller 51 may request that the message generator 52 generates a reply message. In other words, the message generator 52 may generate a reply message when receiving a message with a high criticality level, such as the return command message or the alert notification message. Accordingly, the message transmission controller 57 may set a relatively high criticality level for a reply message with respect to the return command message or the alert notification message.

The transmission power controller 58 may control the transmission power required for transmitting a message, and particularly set a relatively high transmission power for a message with a relatively high criticality level.

Specifically, it is possible to set a higher transmission power value than a previous transmission power value for a reply message with respect to the return command message or the alert notification message by adding a compulsive increment value to the previous transmission power value. When setting a transmission power value, the transmission power controller 58 may set a higher transmission value than the previous transmission power value by adding the product of the number of retransmissions of the transmission message and the compulsive increment value to the previous transmission power value.

In addition, the message transmission controller 23 may count the number of retransmissions of the reply message and provide the transmission power controller 25 with the counted number, and the transmission power controller 25 may set the transmission power value by reflecting the counted number of retransmissions.

Figure 7:
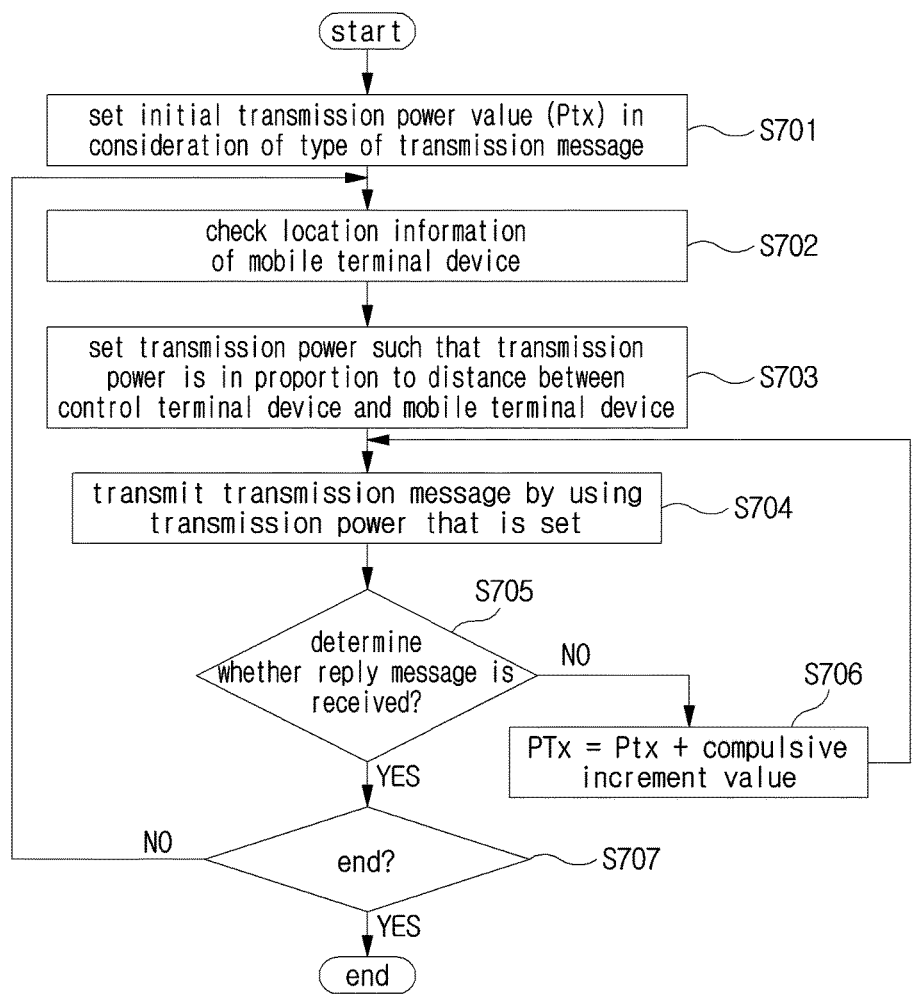
FIG. 7 is a block diagram illustrating the configuration of a downlink transmission power control method according to one embodiment of the present disclosure.

FIG. 7 is a block diagram illustrating the configuration of a downlink transmission power control method according to one embodiment of the present disclosure.

Downlink transmission in one embodiment of the present disclosure may mean transmission from the control terminal device to the mobile terminal device, and the downlink transmission power control method may be executed in the control terminal device described above.

Referring to FIG. 7, at Step S701, the control terminal device may set an initial transmission power value based on a type of a transmission message.

Specifically, the control terminal device may check the type of the transmission message and then determine a criticality level of the transmission message in accordance with the type of the transmission message.

For example, the control terminal device may check the value of the frame type ID and determine the criticality level of the transmission message as follows: when the value of the frame type ID indicates the return command message or the alert notification message, the control terminal device may determine the criticality level of the transmission message as being "high"; when the value of the frame type ID indicates the time information message, the group information message, the initial position information message, or the like, the control terminal device determines the criticality level of the transmission message as being "medium"; and when the value of the frame type ID indicates the receipt notification message, the control terminal device may determine the criticality level of the message as being "low".

The control terminal device may set a transmission power value for a transmission message to be transmitted to a mobile terminal device, by considering the criticality level of the transmission message. That is, the return command message, the alert notification message, and the like are messages with a high criticality level because they occur in dangerous situations. Accordingly, since the return command message, the alert notification message, and the like include important information, the transmission power for those messages is set to a high value so that a reception success rate thereof can be increased. The control terminal device may set transmission power values for respective transmission messages by varying initial transmission power values in accordance with the criticality levels of the transmission messages.

A control manager or a senior firefighter who is in charge of a disaster situation may operate the control terminal device, and other firefighters who are directly dispatched to a disaster scene may be equipped with the mobile terminal devices when entering the disaster scene. In this setting, the control manager or the senior firefighter may directly instruct the dispatched firefighters to go to initial locations, and accordingly the firefighters may follow the instruction. In consideration of this setting, the control manager or the senior firefighter may set the initial locations of the respective mobile terminal devices with which the dispatched firefighters are equipped, by inputting the initial locations into the control terminal device. Thus, the control terminal device can confirm the initial locations of the mobile terminal devices. Alternatively, setting of the initial locations of the mobile terminal devices may be performed group by group.

Due to the setting described above, the control terminal device can receive initial location information of the mobile terminal devices and control a transmission power of a message transmitted to the mobile terminal devices in consideration of the initial location information. For example, the control terminal device may allocate a relatively higher transmission power for communication with a mobile terminal device relatively far from the control terminal device in comparison with for communication with a mobile terminal device relatively close to the control terminal device.

Further, the control terminal device may set initial transmission power values while taking criticality levels of transmission messages and locations of mobile terminal devices into account.

For example, referring to FIG. 4, the control terminal device may determine a distance between a certain mobile terminal device and the control terminal device based on the location information of the mobile terminal device, and may group the mobile terminal devices according to the distances to the control terminal device. For example, mobile terminal devices that are distanced from the control terminal device by a distance that is greater than a first distance may be grouped as a first distance mobile terminal device group 401, and mobile terminal devices that are distanced from the control terminal device by a distance that is less than the first distance but greater than a second distance may be grouped as a second distance mobile terminal device group 402.

In addition, the control terminal device may check the criticality levels of the transmission messages transmitted to the mobile terminal devices within the same mobile terminal device group and may set initial transmission power values of the transmission messages in accordance with the determined criticality levels. For example, when a certain mobile terminal device to receive the transmission message belongs to the first distance mobile terminal device group 410 and the criticality level of the transmission message to be transmitted to the mobile terminal device is high, the control terminal device may set the initial transmission power value of the transmission message set to a power value P15 that is a fifteenth magnitude (highest level). Similarly, when a certain mobile terminal device belongs to the first distance mobile terminal device group 410 and the criticality level of the transmission message to be transmitted to the mobile terminal device is medium, the control terminal device may set the initial transmission power value of the transmission message to a power value of P14 that is a fourteenth magnitude (second highest level). Similarly, when a certain mobile terminal device belongs to the first distance group 410 and the transmission message to be transmitted to the mobile terminal device is low, the control terminal device may set the initial transmission power value of the transmission message to a power value of P13 that is a thirteenth magnitude (third highest level).

At Step S702, the control terminal device may receive location information from each mobile terminal device.

At Step S703, the control terminal device may check the distances between the control terminal device and the mobile terminal devices based on the location information of the mobile terminal devices, and may set transmission power values of a transmission message in proportion to the distances. For example, the control terminal device may set transmission power values in units of a predetermined power value (See P1 to P14 in FIG. 4). A mobile terminal device or a mobile terminal device group that is farthest from the control terminal device is allocated with the highest transmission power value, and the other mobile terminal devices or mobile terminal device groups may be allocated with stepwise-reduced transmission power values in the distance order.

At Step S704, the control terminal device may transmit a transmission message by using the transmission power values that are set at Step S703.

In the case of downlink transmission, all of the transmission messages may sporadically or non-periodically occur but may have a high criticality level. Therefore, the control terminal device may be prepared to receive a reply message after transmitting a transmission message. When the control terminal device receives a reply message (YES in Step S705), the control terminal device ends a process of transmitting the transmission message. However, when there is no reply message (NO in Step S705), the control terminal device may increase the transmission power and retransmit the transmission message by using the increased transmission power at Step S706.

Specifically, at Step S706, the control terminal device may add a compulsive increment value to a previous transmission power value $Pt_x$, thereby setting a higher transmission power value than the previous transmission power value as a current transmission power value.

Further, at Step S706, the control terminal device may check the number of retransmissions of the transmission message, and set the current transmission power value by reflecting the counted number of retransmissions on the compulsive increment value.

Processes ranging from Step S702 to Step S706 may be repeatedly performed until the control terminal device is deactivated (Step S707).

Figure 8:
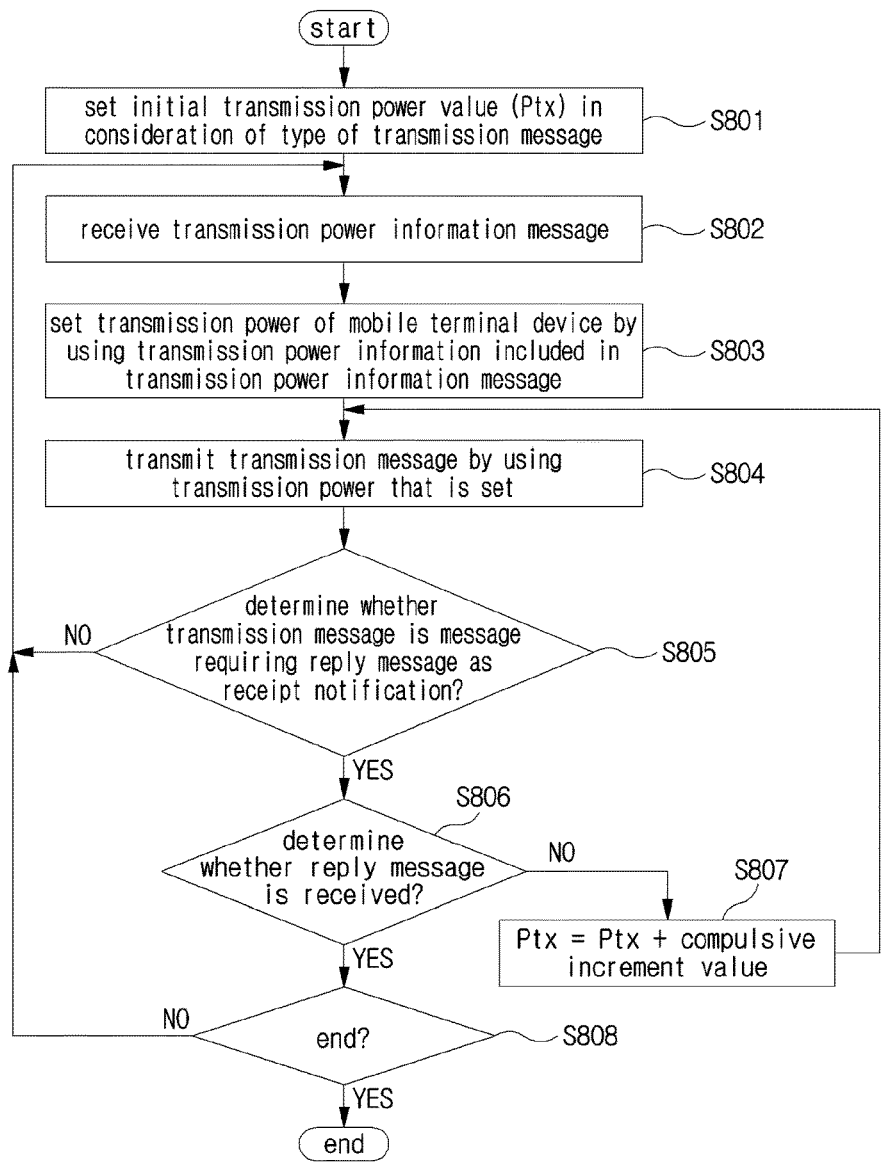
FIG. 8 is a block diagram illustrating the configuration of an uplink transmission power control method according to one embodiment of the present disclosure.

FIG. 8 is a block diagram illustrating an uplink transmission power control method according to one embodiment of the present disclosure.

Uplink transmission in one embodiment of the present disclosure may mean transmission from a mobile terminal device to a control terminal device, and thus the uplink transmission power control method may be performed by the mobile terminal device described above.

At Step S801, the mobile terminal device may set an initial transmission power value based on a type of a transmission message.

Specifically, the mobile terminal device may check the type of the transmission message and determine a criticality level of the transmission message in accordance with the type of the transmission message.

For example, the mobile terminal device may check the value of the frame type ID and determine the criticality level of the transmission message as being "high" when the value of the frame type ID indicates a state information message or a location information notification message.

A control manager or a senior firefighter who is in overall charge of a disaster situation may operate the control terminal device, and firefighters directly dispatched to a disaster scene may be equipped with mobile terminal devices when entering the disaster scene. In this setting, the control manager or the senior firefighter may directly instruct the dispatched firefighters to go to initial locations, and the firefighters may follow the instruction. In this setting, the control manager or the senior firefighter may give the instruction about the initial deployment locations by inputting initial locations of the mobile terminal devices into the control terminal device, and the control terminal device may transmit an initial location information message to the mobile terminal devices. The mobile terminal device receives the initial location information message and may display the initial location information.

Through the process described above, the mobile terminal device may check the initial location information, and control a transmission power of a message transmitted to the mobile terminal device in consideration of the initial location information.

Next, the mobile terminal device may receive a transmission power information message from the control terminal device at Step S802 and set a transmission power value of the mobile terminal device by using the transmission power information included in the transmission power information message at Step S803.

At Step S804, the mobile terminal device may transmit a message by using the transmission power value that is set at Step S803.

At Step S805, the mobile terminal device may check the type of the transmission message. When the transmission message is a message (for example, the alert notification message) requiring a replay message as a receipt notification (YES in Step S805), the mobile terminal device may perform the process of Step S806, i.e., determine whether the reply message is received. Meanwhile, when the transmission message is a message (for example, the state information message, the location information message, or the like) not requiring a reply message as a receipt notification (NO in Step S805), the mobile terminal device may ends transmission of the transmission message and perform another function thereof.

At Step S806, the mobile terminal device ends transmission of a transmission message when a reply message to the transmission message is received (YES in Step S806), and proceeds to the next process. However, when a reply message to the transmission message is not received (NO in Step S806), the mobile terminal device may perform the process of Step S807.

At Step S807, the mobile terminal device may add a compulsive increment value to a previous transmission power value to set a higher transmission power value than the previous transmission power value.

When resetting the transmission power value, the mobile terminal device may set a higher transmission power value than the previous transmission power value by adding the product of the counted number of retransmissions of the transmission message and the compulsive increment value to the previous transmission power value.

The processes ranging from Step S802 to Step S807 may be repeated until the mobile terminal device is deactivated (S808).

Figure 9:
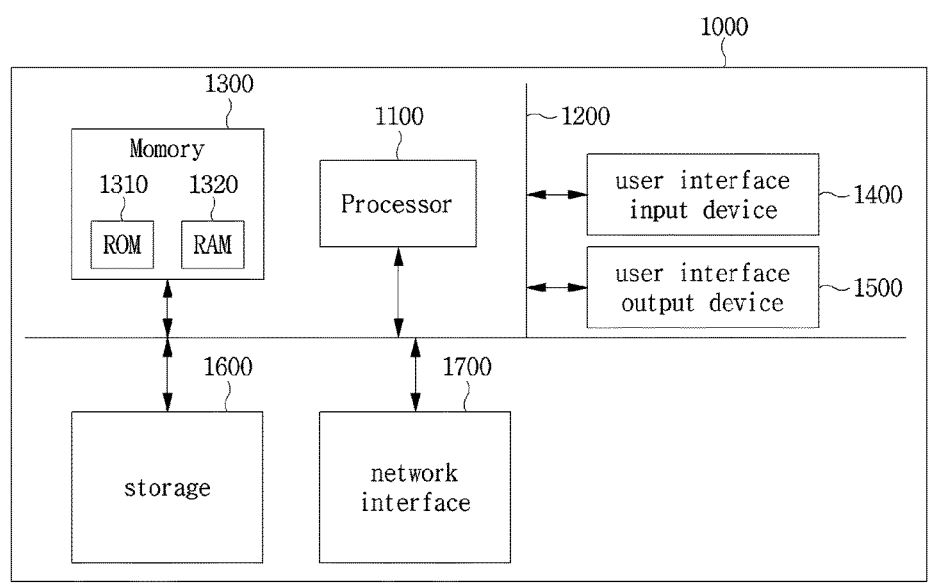
FIG. 9 is a block diagram illustrating a transmission power control method and an example of a computing system for executing the method, according to one embodiment of the present invention.

FIG. 9 is a block diagram illustrating a transmission power control method and an example of a computing system for executing the method, according to one embodiment of the present invention.

Referring to FIG. 9, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:
1. A method of controlling a transmission signal for a disaster scene communication system, the method comprising:
  determining a type of a transmission message transmitted to a mobile terminal device by a control terminal device of the disaster scene communication system;
  determining a criticality level of the transmission message based on the type of the transmission message;

determining an initial distance between the control terminal device and the mobile terminal device by checking initial location information of the mobile terminal device;
setting an initial transmission power in consideration of the criticality level of the transmission message corresponding to the type of the transmission message and the initial distance between the control terminal device and the mobile terminal device; and
controlling a current transmission power with reference to the initial transmission power.

2. The method according to claim 1, wherein the controlling a current transmission power comprises controlling the current transmission power by reflecting the criticality level of the transmission message corresponding to the type of the transmission message.

3. The method according to claim 2, further comprising setting the current transmission power for each of the mobile terminal devices, wherein the current transmission power for each mobile terminal device is set to be in proportion to a distance between the control terminal device and the corresponding mobile terminal device.

4. The method according to claim 1, wherein the controlling a current transmission power comprises:
checking location information of the mobile terminal device periodically at a predetermined time interval;
determining a distance between the control terminal device and the mobile terminal device based on the location information of the mobile terminal device; and
controlling the current transmission power by reflecting the distance between the control terminal device and the mobile terminal device.

5. The method according to claim 1, wherein the controlling a current transmission power comprises setting the current transmission power by adding a compulsive increment value to a previous transmission power when a reply message is not received.

6. The method according to claim 1, wherein the controlling a current transmission power comprises setting the current transmission power by adding a product obtained by multiplying a counted number of retransmissions of the transmission message and a compulsive increment value to a previous transmission power.

7. The method according to claim 1, wherein the controlling a current transmission power comprises setting the current power transmission equal to a previous transmission power when a reply message is received.

8. The method according to claim 7, further comprising:
setting the current transmission power for each mobile terminal device;
generating a transmission power information message including information on the current transmission power for each mobile terminal device; and
transmitting the transmission power information message to each of the mobile terminal devices by using the current transmission power.

9. A method of controlling a transmission signal for a disaster scene communication system, the method comprising:
determining a type of a transmission message transmitted to a control terminal device by a mobile terminal device of the disaster scene communication system;
determining a criticality level of the transmission message,
determining an initial distance between the control terminal device and the mobile terminal device by checking initial location information of the mobile terminal device;
setting an initial transmission power in consideration of the criticality level of the transmission message corresponding to the type of the transmission message and the initial distance between the control terminal device and the mobile terminal device;
controlling a transmission power of the transmission message by using the initial transmission power;
receiving a transmission power information message including information on a current transmission power for the mobile terminal device; and
controlling the transmission power of the transmission message by using the current transmission power.

10. The method according to claim 9, wherein the controlling a transmission power of the current message by using the current transmission power comprises:
determining whether the transmission message is a message requiring a reply message; and
controlling the current transmission power by adding a compulsive increment value to a previous transmission power when the transmission message is determined to require the reply message but the reply message is not received.

11. A control terminal device comprising:
a message generator configured to set a type of a transmission message transmitted to a mobile terminal device of a disaster scene communication system and to generate transmission messages including the transmission message of the type;
a message transmission controller configured to determine a criticality level of the transmission message corresponding to the type of the transmission message;
a modulator configured to output a modulated signal of the transmission message;
a transmission power controller configured to set an initial transmission power in consideration of the criticality level of the transmission message and an initial distance between the mobile terminal device and the control terminal device, and to control a current transmission power based on the initial transmission power; and
a variable gain amplifier configured to amplify the modulated signal with a gain corresponding to the current transmission power.

12. The control terminal device according to claim 11, wherein the transmission power controller controls the current transmission power by reflecting the criticality level of the transmission message corresponding to the type of the transmission message.

13. The control terminal device according to claim 11, wherein the transmission power controller determines a distance between the control terminal device and the mobile terminal device based on location information of the mobile terminal device periodically checked at a predetermined time interval, and controls the current transmission power by reflecting the distance between the control terminal device and the mobile terminal device.

14. The control terminal device according to claim 11, wherein the message transmission controller determines whether a reply message to the transmission message is received and retransmits the transmission message when it is determined that the reply message is not received, when the type of the transmission message is a predetermined type.

15. The control terminal device according to claim 14, wherein the transmission power controller receives a determination result of whether the reply message is received, from the message transmission controller, when the type of the transmission message is the predetermined type, and sets the current transmission power by adding a compulsive increment value to a previous transmission power when the reply message is not received.

16. The control terminal device according to claim 14, wherein the transmission power controller receives a counted number of retransmissions of the transmission message, from the message transmission controller, and sets the current transmission power by adding a product obtained by multiplying the counted number of retransmissions of the transmission message and a compulsive increment value to a previous transmission power.

17. The control terminal device according to claim 14, wherein the transmission power controller receives a determination result of whether a reply message is received, from the message transmission controller, when the type of the transmission message is a predetermined type, and sets a previous transmission power as the current transmission power when the reply message is received.

18. The control terminal device according to claim 11, wherein the transmission power controller sets the current transmission power for each of the mobile terminal devices such that the current transmission powers for the respective mobile terminal devices are in proportion to distances of the respective mobile terminal devices from the control terminal device.

19. A mobile terminal device comprising:
a controller configured to control generation of a transmission message transmitted to a control terminal device of a disaster scene communication system and to detect information included in a reception message that is transmitted by the control terminal device and received by the mobile terminal device;
a message generator configured to set a type of a transmission message transmitted to the control terminal device of the disaster scene communication system and to generate transmission messages including the transmission message of the type;
a modulator configured to output a modulated signal of the transmission message;
a transmission power controller configured to set an initial transmission power in consideration of a criticality level of the transmission message corresponding to the type of the transmission message and an initial distance between the mobile terminal device and the control terminal device, and to control a current transmission power based on information on the current transmission power included in a transmission power information message transmitted by the control terminal device; and
a variable gain amplifier configured to amplify the modulated signal with a gain corresponding to the current transmission power.

20. The mobile terminal device according to claim 19, wherein the transmission power controller determines whether the transmission message is a message requiring a reply message based on the criticality level of the transmission message corresponding to the type of the transmission message, and controls a current transmission power by adding a compulsive increment value to a previous transmission power when the transmission message requires the reply message but the reply message is not received.

* * * * *